US009727705B2

(12) United States Patent
Shah et al.

(10) Patent No.: US 9,727,705 B2
(45) Date of Patent: Aug. 8, 2017

(54) REMOTELY DEFINING SECURITY DATA FOR AUTHORIZATION OF LOCAL APPLICATION ACTIVITY

(71) Applicant: Adobe Systems Incorporated, San Jose, CA (US)

(72) Inventors: Rishit Shah, Mountain View, CA (US); Jian Zheng, San Francisco, CA (US); Anssi Kesti-Helia, San Francisco, CA (US); Rupen Chanda, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/832,209

(22) Filed: Aug. 21, 2015

(65) Prior Publication Data
US 2015/0363577 A1    Dec. 17, 2015

Related U.S. Application Data

(63) Continuation of application No. 13/616,796, filed on Sep. 14, 2012, now Pat. No. 9,148,700, which is a (Continued)

(51) Int. Cl.
*G06F 7/04* (2006.01)
*H04L 29/06* (2006.01)
(Continued)

(52) U.S. Cl.
CPC ............ *G06F 21/10* (2013.01); *H04L 63/101* (2013.01); *H04N 21/2541* (2013.01);
(Continued)

(58) Field of Classification Search
CPC . G06F 21/10; G06F 2221/07; H04N 21/2541; H04N 21/4437; H04N 21/4627;
(Continued)

(56) References Cited

U.S. PATENT DOCUMENTS 6,564,003 B2    5/2003    Marko et al.
7,110,373 B2    9/2006    Lee
(Continued)

FOREIGN PATENT DOCUMENTS

WO    WO-2004054171    6/2004

OTHER PUBLICATIONS

"Binary Runtime Environment for Wireless", BREW 2.1 API Reference, Qualcomm, May 8, 2003, 43 pages.
(Continued)

*Primary Examiner* — Aravind Moorthy
(74) *Attorney, Agent, or Firm* — Wolfe-SBMC

(57) ABSTRACT

Systems and methods, including computer software adapted to perform certain operations, can be implemented for remotely defining security data for authorizing access to data on a client device. Permission indicators are associated with a sequence of instructions, and a protected activity is associated with one or more of the permission indicators and with an instruction within the sequence of instructions. The one or more permission indicators and the sequence of instructions are provided to a remote device. The remote device determines whether execution of the instruction is permitted based, at least in part, on the one or more permission indicators, and the remote device performs the protected activity if execution of the instruction is permitted.

20 Claims, 5 Drawing Sheets

Related U.S. Application Data continuation of application No. 11/945,214, filed on Nov. 26, 2007, now Pat. No. 8,281,390.

(51) Int. Cl.
| | |
|---|---|
| *G06F 9/44* | (2006.01) |
| *G06F 21/10* | (2013.01) |
| *H04W 4/00* | (2009.01) |
| *H04W 12/08* | (2009.01) |
| *H04N 21/254* | (2011.01) |
| *H04N 21/443* | (2011.01) |
| *H04N 21/4627* | (2011.01) |
| *H04N 21/81* | (2011.01) |
| *H04W 12/12* | (2009.01) |

(52) U.S. Cl.
CPC ..... *H04N 21/4437* (2013.01); *H04N 21/4627* (2013.01); *H04N 21/8193* (2013.01); *H04W 4/003* (2013.01); *H04W 12/08* (2013.01); *G06F 2221/07* (2013.01); *H04W 12/12* (2013.01)

(58) Field of Classification Search
CPC . H04N 21/8193; H04L 63/101; H04W 12/08; H04W 4/003; H04W 12/12
USPC ........ 726/26, 27, 29; 713/165, 166; 717/127
See application file for complete search history.

(56) References Cited

U.S. PATENT DOCUMENTS

| | | | | |
|---|---|---|---|---|
| 7,313,824 | B1* | 12/2007 | Bala | G06F 21/10 |
| | | | | 713/187 |
| 7,395,385 | B2 | 7/2008 | Cobley | |
| 8,131,875 | B1 | 3/2012 | Chen et al. | |
| 8,281,390 | B1 | 10/2012 | Shah et al. | |
| 8,869,304 | B1* | 10/2014 | Lee | H04W 4/18 |
| | | | | 713/154 |
| 9,148,700 | B2 | 9/2015 | Shah et al. | |
| 2003/0005019 | A1 | 1/2003 | Pabla et al. | |
| 2005/0005081 | A1* | 1/2005 | Ehama | G06F 12/1027 |
| | | | | 711/163 |
| 2005/0009538 | A1 | 1/2005 | MacKay et al. | |
| 2005/0091525 | A1* | 4/2005 | Snover | G06F 21/53 |
| | | | | 726/27 |
| 2005/0144152 | A1 | 6/2005 | Punaganti et al. | |
| 2005/0278790 | A1* | 12/2005 | Birk | G06F 21/54 |
| | | | | 726/26 |
| 2005/0286856 | A1 | 12/2005 | Aerts | |
| 2006/0048099 | A1* | 3/2006 | Templin | G06F 21/53 |
| | | | | 717/124 |
| 2006/0085439 | A1* | 4/2006 | Sawyer | G06F 9/44505 |
| 2006/0107327 | A1 | 5/2006 | Sprigg et al. | |
| 2006/0205385 | A1* | 9/2006 | Davydov | G06F 21/10 |
| | | | | 455/411 |
| 2007/0115929 | A1 | 5/2007 | Collins et al. | |
| 2007/0117536 | A1 | 5/2007 | Walker et al. | |
| 2007/0130331 | A1 | 6/2007 | Kao et al. | |
| 2007/0157077 | A1* | 7/2007 | Gibson | G06F 17/30882 |
| | | | | 715/205 |
| 2007/0174899 | A1 | 7/2007 | Broberg et al. | |
| 2007/0198698 | A1 | 8/2007 | Boyd et al. | |
| 2007/0199019 | A1 | 8/2007 | Angiolillo et al. | |
| 2007/0261124 | A1* | 11/2007 | Centonze | G06F 21/6227 |
| | | | | 726/27 |
| 2008/0010417 | A1 | 1/2008 | Zeffer et al. | |
| 2008/0025230 | A1* | 1/2008 | Patel | H04L 41/5022 |
| | | | | 370/252 |
| 2008/0076573 | A1 | 3/2008 | Loehrer | |
| 2008/0104710 | A1 | 5/2008 | Jorden et al. | |
| 2008/0155013 | A1 | 6/2008 | Morris | |
| 2008/0243998 | A1 | 10/2008 | Oh et al. | |
| 2008/0319734 | A1 | 12/2008 | Kim | |
| 2009/0138477 | A1 | 5/2009 | Piira et al. | |
| 2009/0210942 | A1 | 8/2009 | Abel | |
| 2009/0221266 | A1* | 9/2009 | Ohta | G06F 21/604 |
| | | | | 455/411 |
| 2009/0307781 | A1* | 12/2009 | Iga | G06F 21/53 |
| | | | | 726/27 |
| 2014/0007256 | A1 | 1/2014 | Shah et al. | |

OTHER PUBLICATIONS

"Final Office Action", U.S. Appl. No. 11/945,214, Mar. 8, 2011, 16 pages.
"Final Office Action", U.S. Appl. No. 13/616,796, May 2, 2014, 13 pages.
"Final Office Action", U.S. Appl. No. 13/616,796, May 29, 2015, 6 pages.
"Non-Final Office Action", U.S. Appl. No. 13/616,796, Oct. 29, 2013, 13 pages.
"Non-Final Office Action", U.S. Appl. No. 11/945,214, Sep. 22, 2010, 13 pages.
"Non-Final Office Action", U.S. Appl. No. 13/616,796, Dec. 24, 2014, 15 pages.
"Notice of Allowance", U.S. Appl. No. 11/945,214, Jun. 6, 2012, 8 pages.
"Notice of Allowance", U.S. Appl. No. 13/616,796, Jun. 22, 2015, 6 pages.
"U.S. Application as Filed", U.S. Appl. No. 10/791,298, filed Mar. 1, 2007, 43 pages.
"U.S. Application as Filed", U.S. Appl. No. 10/791,299, filed Mar. 1, 2004, 26 pages.
"U.S. Application as Filed", U.S. Appl. No. 10/791,311, filed Mar. 1, 2004, 27 pages.
"U.S. Application as Filed", U.S. Appl. No. 11/567,111, filed Dec. 5, 2006, 24 pages.
"What is Push Technology?", Whatis.com, retrieved from <http://searchsoa.techtarget.com/sDefinition/0,,sid26_gci213345,00.html> on Aug. 10, 2010, 3 pages.
"What is Triangulation?", Whatis.com, retrieved from <http://searchnetworking.techtarget.com/sDefinition/0,,sid7_gci753924,00.html> on Aug. 10, 2010, 2 pages.

* cited by examiner

| BIT POSITION | STANDARD PERMISSIONS | STANDARD EXTENSION PERMISSIONS | CUSTOM EXTENSION PERMISSIONS |
|---|---|---|---|
| 0 | system | systemInfoRead | Ext. A |
| 1 | mydata | systemInfoWrite | Ext. B |
| 2 | alldata | callLogRead | Ext. B |
| 3 | netsys | callLogWrite | Ext. B |
| 4 | fscommand | contactsRead | Ext. B |
| 5 | getSetting | contactsWrite | Ext. C |
| 6 | setSetting | MessagingRead | Ext. C |
| 7 | scratchpad | MessagingWrite | reserved |
| 8 | sharedData | deviceExperienceRead | reserved |
| 9 | standalone | deviceExperienceWrite | reserved |
| 10 | appLaunch | mediaRead | reserved |
| 11 | dialogAPIaccess | mediaWrite | reserved |
| 12 | switchHomeScreen | appLauncherRead | reserved |
| 13 | networkAccessRead | appLauncherWrite | reserved |
| 14 | networkAccessWrite | utilitiesRead | reserved |
| 15 | localFileAccess | utilitiesWrite | reserved |
| 16 | socketAccessRead | reserved | reserved |
| 17 | socketAccessWrite | reserved | reserved |
| 18 | networkVideoAccess | reserved | reserved |
| 19 | getUrlAll | reserved | reserved |
| 20 | getUrlSWF | reserved | reserved |
| 21 | getUrlHttp | reserved | reserved |
| 22 | getUrlHttpPost | reserved | reserved |
| 23 | getUrlHttps | reserved | reserved |
| 24 | getUrlHttpsPost | reserved | reserved |
| 25 | getUrlTel | reserved | reserved |
| 26 | scriptingAllowed | reserved | reserved |
| 27 | localFileScriptingAllowed | reserved | reserved |
| 28 | childAllowedToAccessFeedStore | reserved | reserved |
| 29 | allowChildToInheritPermissions | reserved | reserved |
| 30 | getPreferences | reserved | reserved |
| 31 | getDeviceID | reserved | reserved |

*FIG. 2*

REMOTELY DEFINING SECURITY DATA FOR AUTHORIZATION OF LOCAL APPLICATION ACTIVITY

CROSS-REFERENCES TO RELATED APPLICATIONS

This application is a continuation of and claims priority to U.S. application Ser. No. 13/616,769, filed Sep. 14, 2012, which is a continuation of and claims priority to U.S. application Ser. No. 11/945,214 titled "Remotely Defining Security Data for Authorization of Local Application Activity", filed Nov. 26, 2007. These disclosures are incorporated by reference herein in their entirety.

BACKGROUND

The present disclosure relates to providing and enforcing security procedures in computer systems in general and more specifically relates to providing and enforcing security procedures in mobile information systems. In a mobile information system, subscribers may register with a wireless service provider to receive various types of content from the service provider on their mobile devices. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Content provided to mobile devices equipped with such application environments is sometimes delivered in executable file formats such as the precisely described SWF (small web format) binary vector graphics format. SWF provides a compact, TAG-based, easily extendible format that supports streaming, bitmap and vector graphics, and scripting.

SUMMARY

Computer systems, such as mobile information systems, may include security mechanisms to prevent content received from non-trusted sources from accessing protected data. For example, a subscriber to a mobile information system may also subscribe to phone services from the wireless provider. Call logs, address books, and other data files associated with the phone services may be stored in a protected area inaccessible to content received from non-trusted sources. Such systems may also include security procedures to prevent content received from non-trusted sources from performing unauthorized activities. For example, a mobile device application executing a SWF file originating from a particular network domain might allow the SWF file to interact only with content originating from that particular network domain. Any attempt by the SWF file to interact with content originating from a different network domain may be blocked.

This specification describes technologies relating to providing and enforcing security procedures in computer systems.

In general, one aspect of the subject matter described in this specification can be embodied in a method that includes associating one or more permission indicators with a sequence of instructions. A protected activity is associated with a first of the permission indicators and with an instruction within the sequence of instructions. The one or more permission indicators and the sequence of instructions are provided to a remote or mobile device. The remote device determines whether execution of the instruction is permitted based, at least in part, on the first permission indicator and performs the protected activity if execution of the instruction is permitted. Other embodiments of this aspect include corresponding systems, apparatus, and computer program products.

In another general aspect, a system includes a persistent storage device and one or more processors that interact with the persistent storage device. The processors retrieve a permissions data structure from the persistent storage device. The permissions data structure includes one or more permission indicators associated with at least one protected activity. The permissions data structure is associated with a sequence of instructions, and a transmission including the sequence of instructions and the permissions data structure is assembled. The transmission is sent to a remote device, and the remote device determines that a first protected activity is prohibited based, at least in part, on the one or more permission indicators. The remote device then executes the sequence of instructions, while blocking the first protected activity. Other embodiments of this aspect include corresponding methods, apparatus, and computer program products.

These and other embodiments can optionally include one or more of the following features. The sequence of instructions and the one or more permission indicators are provided in a single transmission over a communications network. The value of the first permission indicator is set prior to providing the one or more permission indicators to the remote device, and the first permission indicator is stored in a persistent storage device. The first permission indicator is updated, and the first permission indicator is replaced with the updated first permission indicator in the persistent storage device. Prior to associating the one or more permission indicators with the sequence of instructions, the sequence of instructions is received and the first permission indicator is retrieved from a persistent storage device. The one or more permission indicators can include multiple permission bits, and the first permission indicator corresponds to a first of the multiple permission bits. A second of the permission indicators is associated with a different protected activity, and the second permission indicator corresponds to a second of the permission bits. The sequence of instructions is included in a SWF file. The instruction can be received from a content provider and provided to the remote device. The sequence of instructions can be assembled based, at least in part, on the received information, and the instruction can be provided to the remote device as part of the sequence of instructions. The remote device can execute the instruction in response to a stimulus from a user of the remote device. The permission indicator can be assigned to a particular permission indicator position, and the permission indicator can be provided to the remote device as part of a permissions data structure.

The one or more processors include a server that interacts with the remote device through a data communication network, and the remote device is operable to interact with the server as a client. The one or more processors set the value of the one or more permission indicators. The number of permission bits is greater than the number of permission indicators. The one or more permission indicators include a first permission indicator and a second permission indicator, and the determination that the first protected activity is prohibited is based on the first permission indicator. The remote device determines that a second protected activity is permitted based on the second permission indicator, and the sequence of instructions is executed to perform the second protected activity.

Particular embodiments of the subject matter described in this specification can be implemented to realize one or more of the following advantages. Permissions associated with protected activities in a mobile information system can be configured at a central remote location and propagated to individual mobile devices for enforcement by preconfigured software on the mobile devices. Permissions associated with protected activities can be added, removed, or updated at the central location by a mobile service provider or other trusted third party. Individual mobile device subscribers need not be aware that updates have occurred. New content provided to individual mobile devices can be accompanied by permissions restricting the activities of the content. Content from trusted providers can be accompanied by permissions allowing the content to perform restricted activities. Different sets of permissions can be associated with different content channels, allowing content from trusted sources greater access to restricted activities, while restricting content from non-trusted sources. Received permissions can be stored on the mobile device and are therefore immediately available, even when the device is not in communication with the central location. Application extension developers can define and implement extension-specific permissions that are configured at the central location and provided to the extensions on the mobile devices. Individual protected activities can be governed by individual permissions.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 2 is an example data structure for use in associating permissions with content in a mobile information system.

Like reference numbers and designations in the various drawings indicate like elements.

DETAILED DESCRIPTION

Figure 1:
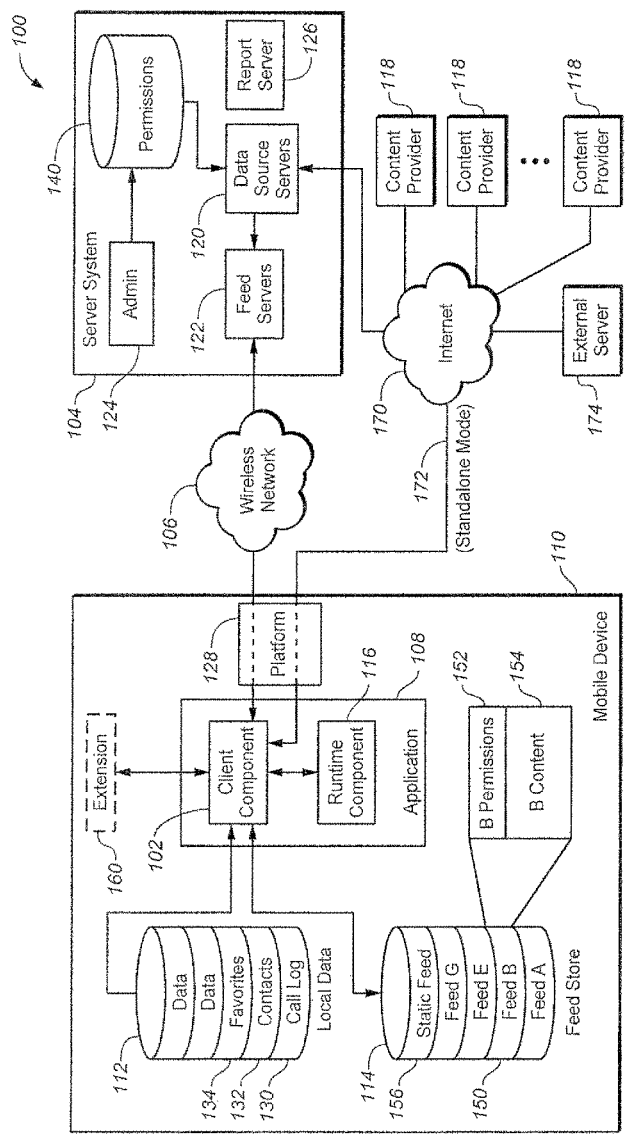
FIG. 1 is an example system for providing system security by associating permissions with content.

When a computer system, such as a mobile information system, is configured to receive content from a non-trusted source, the computer system may implement security procedures to prevent the content from accessing protected data or from performing unauthorized activities. In a mobile information system, subscribers may register with a wireless service provider to receive various types of content from the service provider on their mobile devices. Third party content providers may also register or contract with the wireless service provider to provide various types of content to subscribers over a network, such as the Internet, via the service provider. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Content provided to mobile devices equipped with such application environments are sometimes delivered in executable file formats such as the precisely described SWF binary vector graphics format. SWF provides a compact, TAG-based, easily extendible format that supports streaming, bitmap and vector graphics, and scripting. Content may include other data or files, such as a feature film, an executable software update, or a software extension.

In some implementations, wireless service providers deliver content to the mobile devices of their subscribers in the form of information channels. Each information channel may originate with the wireless service provider or may originate with third party content providers. When a subscriber subscribes to a particular information channel, the wireless service provider delivers content associated with that information channel to the subscriber's mobile device. The content may be delivered as a channel feed to a file system (i.e., a feed store) located on the mobile device. The feed store may be logically divided into separate compartments or memory allocations with each channel assigned its own compartment on a static or dynamic basis. Periodically, the wireless service provider may deliver channel content updates to the mobile device. The updates may be provided according to a predetermined schedule, in response to a request from the mobile device, in response to an availability of updates at the content provider, in response to an expiration or consumption (e.g., viewing) of content previously delivered to the mobile device or in some other way. Because the channel content is stored locally on the mobile device and frequently updated, the subscriber is usually able to access the channel without having to wait for channel content or content updates to be delivered over the network. The channel content may be automatically delivered to the mobile device in the background (i.e., without a specific user request and/or while the mobile device is otherwise idle or being used to view other channels or perform other operations.

For example, a wireless service provider may offer several different information channels to its subscribers. Some information channels may be freely available to all subscribers, while other information channels may require premium subscriber status. The content of some information channels may originate with the wireless service provider. The content of other information channels may originate with third parties that have registered with the service provider. The content of still other information channels may originate with other sources. The offered information channels may include a premium news channel. If a subscriber has subscribed to the premium news channel, then the wireless service provider may establish a channel feed to periodically or sporadically deliver content from the premium news channel to the feed store located on the subscriber's mobile device. When the subscriber accesses the premium news channel, processes on the mobile device retrieve the content from the feed store. Even if the subscriber rarely or even never accesses the premium news channel, the channel feed may provide for regular updates of channel content in the feed store based, for example, on an expiration of content and/or an availability of new content.

Channel content may be in the form of text, images, vector graphics, bitmaps, frame-based animation, video, or in any other format supported by the mobile information system, and may include executable scripts or other sequences of instructions. Depending on the format of the channel content, an application running on the mobile device, such as a media player or other type of runtime component, may be invoked to run the script, execute the instructions, or otherwise display the content. One example of such a mobile information system is described in U.S. patent application Ser. No. 10/791,298, filed Mar. 1, 2004 and entitled "MOBILE RICH MEDIA INFORMATION SYSTEMS," the entire contents of which are hereby incorporated by reference.

To prevent channel content such as script files or other executable files from performing unauthorized activities, the mobile information system may be configured to associate permissions with the information channel. For example, a wireless service provider administering the mobile information system (e.g., T-Mobile®, Verizon Wireless®, or Sprint Nextel®), upon establishing a new information channel, may associate a set of permissions with the information channel. The mobile information system may then communicate some or all of these permissions by including permission indicators in the channel feed established by the wireless service provider over a wireless network, either as part of the feed for each channel, as part of a separate service maintenance channel, or as overhead data separate from the channel feed. Processes on the mobile device may then review these permission indicators in determining whether an information channel is allowed access to restricted activities and data.

FIG. 1 illustrates an example system 100 for providing system security by associating permissions with content. System 100 represents a mobile information system for delivering mobile data services to mobile device 110. The mobile information system represented in system 100 is administered by a wireless service provider, such as T-Mobile®, Verizon Wireless®, or Sprint Nextel®, that operates wireless network 106. Subscribers to the wireless service may receive external content from content providers 118 through mobile device 110. In some implementations, mobile device 110 is a mobile phone. In other implementations, mobile device 110 is a personal data assistant, a laptop computer, or any other device suitable to receive content over wireless network 106. Mobile device 110 may be configured to store local data 112, which may include call log 130, contacts 132, and favorites 134, as well as various other types of local data (e.g., settings and preferences, calendar appointments and reminders, task lists, and the like). Call log 130 may represent calls recently initiated or received by mobile device 110. Contacts 132 may represent a subscriber's associates and may include names, home and business addresses, phone numbers, email addresses, and other information related to the subscriber's associates. Favorites 134 may represent the phone numbers associated with the subscriber's calling plan. Call log 130, contacts 132, and favorites 134 represent examples of data that may be stored as local data 112 on mobile device 110. Individual implementations may include none, some, or all of these examples, in addition to other types of local data not shown.

At a high level, server system 104 may retrieve information from content providers 118, organize the retrieved information along with some or all of any associated permissions 140 into individual information channel feeds, and deliver the information channel feeds to client 102. Client 102 may then store the information channel feeds, including the associated permissions, in feed store 114. In addition to the dynamic channel feeds received from server system 104, feed store 114 may also contain one or more static feeds 156. Static feed content and associated permissions may be preloaded on mobile device 110 instead of delivered by server system 104. In addition to providing information, channel feeds may also be used to provide services, such as a home page user interface, calendar user interface and services, or other user interfaces or specialized application services. From a security standpoint, there may be little or no difference between static feeds and dynamic feeds or between information channels and service channels.

When a subscriber attempts to access a particular information channel, for example, channel B 150, client 102 may retrieve channel B content 154 and channel B permissions 152 from feed store 114. Depending on the format of channel B content 154, client 102 may provide channel B content 154 to runtime component 116. In some implementations, channel B content 154 is a SWF file and runtime component 116 is an Adobe® Flash®-based runtime component. If channel B content 154 attempts to access restricted data or attempts to perform a protected activity, client 102 may check channel B permissions 152 to determine whether to allow the attempted data access or protected activity. Client 102 and runtime component 116 may form two parts of a single application 108 running on mobile device 110. The application 108 may include a virtual machine running on a device platform 128.

In some implementations, the functionality of runtime component 116 may be extended. Such an extension 160 may be used to expand the functionality of runtime component 116, such as by providing support for additional commands. For example, a service provider may wish to provide channel content that displays or otherwise accesses or manipulates data from local data 112 such as call log 130. The service provider may develop a custom command or instruction that can be provided in the channel feed and stored in feed store 114. Such a command may be unrecognized by unextended runtime component 116. The service provider may then install a custom extension 160 on mobile device 110 that recognizes and performs the custom command or instruction, effectively increasing the number of commands or instructions recognized by runtime component 116. In another example, a third party content provider may develop a custom command or instruction to perform some other activity. Extension 160 may be distributed preinstalled on mobile device 110 or may be downloaded to mobile device 110, for example over wireless network 106.

Client 102 provides a framework for displaying and managing content received on mobile device 110, including content received from server system 104. Client 102 may be responsible for the caching and rendering of received content, for communication with server system 104, and for various other tasks. Client 102 may manage subscriber input and memory devices 112 and 114. In addition, client 102 may manage security features that protect the privacy of subscribers and content and prevent unauthorized parties from interfering with the service. In some implementations, client 102 is distributed preinstalled on mobile device 110, while in other implementations, client 102 or an update to client 102 is downloaded to mobile device 110, for example over wireless network 106.

Client 102 may access runtime component 116 to render a user interface and content. In some implementations, runtime component 116 is a media player that supports vector graphics, bitmaps, and frame-based animation, as well as text input and dynamic text. Runtime component 116 may be able to process files, such as SWF files, in which content providers 118 use native device fonts or embed arbitrary fonts. Runtime component 116 may also support scripting integration with mobile device 110 capabilities, including keypad navigation, button presses, notification, messaging, and media playback, as well as integration with general mobile device 110 operating system functionality. This enables client 102 to be integrated with other mobile device 110 applications and functionalities. Scripting may be accomplished with ActionScript™ or any other suitable scripting language supported by runtime component 116.

Client 102 may be configured to interact with mobile device 110's underlying features and applications through a set of scriptable commands. Such commands may enable channel content to retrieve and set subscriber preferences, provide time and date information from the host environment, or launch external applications such as a browser or media player. In some implementations, upon launching an external application, the subscriber is instantly transferred to that application. Client 102 may maintain the state of the user interface so that the subscriber can return to the same screen of client 102 from which the external application was launched, creating a perception of an integrated experience.

Client 102 may have a fully customizable user interface design that consists of individual Flash® elements (i.e., SWF files) independent of client 102's core functionality. In some implementations, the SWF files enable subscribers to use mobile device 110's soft keys to control navigation and client 102's meta functions such as setting preferences. Client 102 may be updated over wireless network 106 and may use an asynchronous communication protocol that updates all content through a background delivery mechanism that is transparent to subscribers. This enables subscribers to continue browsing one information channel, for example, channel B 150, while a different information channel is updated in the background. Subscribers can also change their preferences when offline; the transaction-based client-server protocol may ensure that such requests will be fulfilled the next time client 102 connects to server system 104. Communications between client 102 and server system 104 may be facilitated through libraries native to platform 128. Platform 128 represents the device-dependent operating system running on mobile device 110. Example implementations of platform 128 are BREW® OS, Symbian OS™, BlackBerry® OS, Windows Mobile® OS, Palm OS®, Linux, Windows XP®, Mac OS®, and the like.

When running in background mode, client 102 may minimize battery usage while periodically receiving updates from server system 104. In some implementations, subscribers can choose between a number of battery-conserving update options, for example, always update, update only when battery strength is above a certain level, and never update. If supported by platform 128, different applications may be running simultaneously. In such cases, client 102 may minimize its use of memory resources when other applications are active. For example, client 102 may have a hibernate mode in which it consumes only a fraction of its normal operating memory. Client 102 may also be configured to limit the number of information channels to which a subscriber may subscribe. When this limit is reached, client 102 may require a subscriber to remove an information channel before a new information channel may be added. Client 102 may also support Short Message Service (SMS) signaling, allowing server system 104 to awaken client 102 and initiate an immediate content update in the case of important events such as breaking news or an immediate retraction of inappropriate content.

Server system 104 may include clusters of feed servers 122 and data source servers 120, as well as report server 126. Report server 126 may allow service providers to monitor server activities and network traffic and may be integrated with other enterprise reporting solutions. The client-server architecture of system 100 may use clustering technology to help ensure performance, reliability, and scalability while minimizing deployment complexities through a flexible integration framework. Server system 104 may aggregate content from external content providers 118 received over the Internet 170 and organize the content into channel content feeds. Server system 104 may filter content feeds based on user preferences, mobile device 110 types, and access controls. Server system 104 may deliver the content feeds to client 102 over wireless network 106. Data source servers 120 may retrieve, normalize, and aggregate content from the web servers of content providers 118, may transform various formats of retrieved content, for example, into a common XML format, and may pass the content on to feed servers 122 for delivery to client 102. Retrievals may be scheduled at predetermined intervals, at which times only differential updates may be collected. Data source servers 120 may be configured to handle content feeds in various formats (e.g., RSS, Atom, XML, etc.). Content feeds may support embedded content types including, for example, text, images, and SWF files.

Using system 100, service providers may be able to provide targeted data service offerings to subscribers. Service providers may be able to promote specific content bundles to certain segments such as business people, teens, casual users, and others. Service providers may be able to make specific content bundles available to all subscribers in, for example, a channel guide, allowing subscribers to select specific content bundles. To increase network efficiency, server system 104 may operate in an occasionally connected data model and may use a communication protocol that enables differential updates, minimizing unnecessary exchanges of data between server system 104 and client 102. For example, in the case of a weather channel, only an update to the temperature may be required, while all other content, such as images, video, or forecasts, remains the same.

Server system 104 may be equipped with an administrator process 124 providing the functionality required to manage the servers, including channel administration, subscriber administration, and system management. Using administrator process 124, service providers can check, for example, the amount of network traffic each channel generates, deactivate poorly performing channels, and dynamically provision, modify, or remove channels, among other tasks. As part of channel administration, service providers may use administrator process 124 to configure and store permissions 140 and associate permissions 140 with individual channel feeds. At least because the content in an individual channel feed may originate from more than one network domain, or even more than one content provider, security based strictly on domain of origin alone may be insufficient. Permissions allow the service provider to define with particularity the types of protected activities available to a channel. A set of permissions may be maintained on server system 104 for each channel supported by the mobile information system, and may be delivered via the channel content feed to client 102 from server system 104. In some implementations, the permissions associated with a channel are delivered to client 102 with the initial delivery of content for the particular channel, and thereafter delivered only if the channel's associated permissions have changed. In other implementations, the permissions or a subset of the permissions associated with a channel are delivered to client 102 with each delivery of content for the particular channel. In still other implementations, a different scheme for delivering permissions may be employed, so long as permissions received by client 102 are associated with at least one channel.

When client 102 receives a content update from server system 104 via the channel feed, client 102 stores both the channel content and the permissions associated with the content in feed store 114. For example, when client 102 receives a content update for Channel B, client 102 updates Channel B feed 150 in feed store 114. Both Channel B content 154 and the associated Channel B permissions 152 are stored. Channel B feed 150 may be updated multiple times before a subscriber ever accesses it. When a subscriber accesses Channel B through the mobile device 110 user interface, client 102 may retrieve Channel B content 154 (e.g., a SWF file) and Channel B permissions 152 (e.g., a set of permission indicators) and provide at least the content to runtime component 116 (e.g., a media player). Typically, the client 102 may retain the permissions 152. This allows the client 102 to enforce a degree of security by determining whether actions requested by the content are allowed. In some implementations, runtime component 116 may receive Channel B permissions 152. Runtime component 116 may make no attempt to interpret or otherwise process Channel B permissions 152 but simply retains them as associated with Channel B content 154. As runtime component 116 executes Channel B content 154, any attempt by Channel B content 154 (or runtime component 116) to perform a protected or restricted activity may pass through client 102 and cause client 102 to retrieve or access the relevant permissions 152 (e.g., from the client's own internal memory or cache) along with the relevant data associated with the protected or restricted activity. Client 102 may then inspect Channel B permissions 152 to determine whether the attempted activity is allowed for Channel B. If the attempted activity is not allowed, client 102 may prevent the execution of the attempted activity.

As runtime component 116 executes Channel B content 154, any attempt by Channel B content 154 to access custom extension 160 may cause custom extension 160 to retrieve one or more Channel B permissions 152 from client 102. In this case, neither runtime component 116 nor client 102 may attempt to interpret or otherwise process Channel B permissions 152. Custom extension 160 may inspect Channel B permissions 152 to determine whether any permissions dedicated to custom extension 160 have been defined and if so, custom extension 160 is responsible for interpreting such dedicated permissions and for taking appropriate action.

In some implementations, client 102 can operate in more than one mode, for example, a server-managed mode and a non-server-managed mode. In a non-server-managed mode, client 102 may receive 172 content that is not managed by server system 104, for example from external server 174 over Internet 170. Unmanaged content may not be stored in feed store 114. Permissions associated with unmanaged content may still be provided to client 102; however, the permissions may be read from a configuration file delivered to client 102 in a loader application rather than read from feed store 114. The loader application may deliver both the content and the permissions associated with the content. In server-managed mode, permissions are provided by server system 104 as described above, and client 102 will ignore any permissions provided by a loader application.

In server-managed mode, the channel activation process on mobile device 110 begins with client 102 loading a file from feed store 114 into runtime component 116. This file may be referred to as a root SWF. A root SWF is typically allowed to access content from its own channel feed without permission. However, if a root SWF attempts to access content from a different feed, a cross feed access permission may be required. A cross feed access permission is one example of a permission that may be associated with a particular channel. A SWF with permission to load items from another feed may not necessarily have permission to script SWFs from that feed. A SWF attempting to access variables or functions inside of a second SWF is said to be scripting the second SWF. In some implementations, a separate permission governs whether a SWF from a channel feed may be scripted, and a SWF with permission to load items from a particular feed may script SWFs from that feed only if SWFs from that feed have permission to be scripted. Separate permissions may govern whether a SWF is allowed to perform other activities, for example, to load video files.

A root SWF may attempt to load a child SWF. If the child SWF is loaded from the same feed as the root SWF, the child SWF will typically inherit the permissions of the root SWF. If the child SWF is loaded from any other location, additional permissions associated with the root SWF may determine what its remote child SWF is allowed to do. For example, a permission may determine whether a remote child SWF is allowed to access feed store 114, and another permission may determine whether a remote child SWF is allowed to inherit permissions from its parent SWF.

A root or child SWF may attempt to perform various activities using the ActionScript™ getURL global function. Such activities may include replacing the root SWF, loading a document into a browser, or sending an SMS or Multimedia Message Service (MMS) message, to name a few. In some implementations, these and other getURL requests are each associated with a separate permission. For example, a root SWF may not require a permission to replace itself, but a child SWF may require a permission to replace the root SWF. An HTTP/HTTPS call may require a permission, and an HTTP/HTTPS call with a post data request may require an additional, separate permission.

The above examples represent only a few of the many circumstances where content-associated permissions may provide dynamic, flexible, and fully customizable system security. A data structure useful in flexibly associating permissions with content is illustrated in FIG. 2. Example data structure 200 comprises three 32-bit substructures, with each bit in each substructure corresponding to a protected activity governed by a permission. Logic interpreting the permission bits may be designed to allow the protected activity when the bit is set, and to deny the protected activity when the bit is not set. Alternatively, logic interpreting the permission bits may be designed to deny the protected activity when the bit is set, and to allow the protected activity when the bit is not set. A separate set of permissions corresponding to data structure 200 may be established for each channel supported by the system. In some implementations, arrays of 32-bit values may be used to provide the flexibility to support greater numbers of permissions and/or more permission data. Permissions may be passed from a loader application at the server to the client as comma-delimited lists of strings, which facilitates adding new permissions and/or original equipment manufacturer (OEM) or other third party permissions at a later time without having to make changes to the application programming interface (API).

A wireless service provider administering the mobile information system may use the administrator process on the server system to create a set of permissions according to data structure 200 for each channel supported by the mobile information system. The service provider administrator may determine, for every permission represented by a permission bit in data structure 200, whether the corresponding protected activity is allowed or denied for the corresponding channel. These permission bits may be persistently stored on the server system, periodically updated by the service provider administrator, and provided to the client in the channel feed of each channel. When received at the client, the permissions bits are persistently stored in the feed store along with the channel content and retrieved by the client in conjunction with displaying or otherwise executing the channel content on the mobile device. In some implementations, different permissions may be associated with different types or sources of content within a single channel. Moreover, permissions may be associated with certain types or sources of content without regard to a particular channel.

In example data structure 200, the permission bits in substructure 210 represent the standard permissions that govern protected activities that are not associated with an extension to the runtime component. Such standard protected activities may include, for example, accessing local data, accessing other feeds, cross-feed scripting, accessing the feed store by a child SWF, performing a getURL command, replacing the root SWF, inheriting permissions, and loading video. The standard permissions are typically predefined in the architecture of the mobile information system, and may be configured with default settings denying access to protected activities. The wireless service provider administrator may then selectively modify the standard permissions for particular channels, while leaving other channels with the default permission settings. In example data structure 200, all bits in substructure 210 have been defined; however, in some implementations, some bits will be reserved for future expansion.

The permission bits in substructure 230 represent custom extension permissions that govern protected activities associated with an extension to the runtime component. Such extensions may be provided by the wireless service provider or by a third party (e.g., a party authorized by the wireless service provider to define at least some permissions). These permission bits are originally reserved in the architecture of the mobile information system and are meaningless until defined by the service provider administrator. For example, Extension A may provide functionality that includes one activity that should be protected, Extension B may provide functionality that includes four activities that should be protected, and Extension C may provide functionality that includes two activities that should be protected. The developer of Extension A must coordinate with the service provider administrator to reserve one bit in substructure 230 for use by Extension A, the developer of Extension B must coordinate with the service provider administrator to reserve four bits in substructure 230 for use by Extension B, and the developer of Extension C must coordinate with the service provider administrator to reserve two bits in substructure 230 for use by Extension C. The administrator process of the server system may provide the service provider administrator with the necessary tools for defining the names and locations of the custom extension bits, for setting default values for the custom extension bits, and for modifying the custom extension bits. When these permission bits are retrieved by the client from the feed store in conjunction with displaying channel content on the mobile device, the bits are simply provided to the custom extensions for interpretation and appropriate action.

The permission bits in substructure 220 represent standard extension permissions that govern protected activities associated with an extension to the runtime component. Such extensions are typically provided by the wireless service provider. Standard extension permissions are similar to custom extension permissions; however, standard extension permissions govern protected activities commonly implemented by service providers in mobile information systems, such as activities associated with contact information or a call log. Standard extension permissions are predefined for the convenience of the service provider. The service provider may choose whether or not to use the predefined standard extension permissions when developing extensions.

Data structure 200 and its accompanying description illustrate one example for organizing content-associated permissions in a mobile information system. It will be understood that this data structure is for illustration purposes only and that other data structures may be used so long as the data structure remains appropriate for communicating permissions from the server system to the mobile device client.

Figure 3:
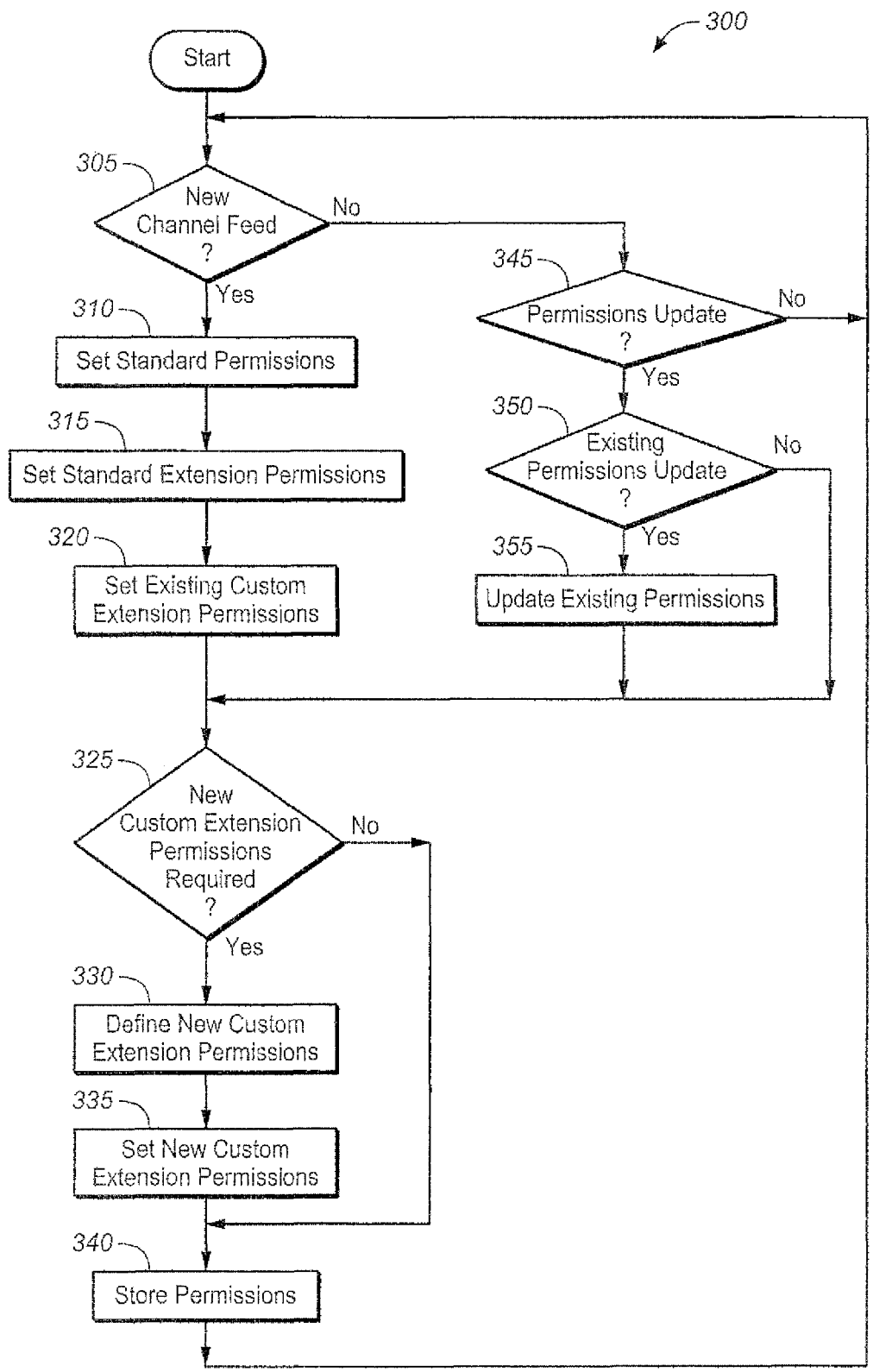
FIG. 3 is a flowchart illustrating an example method for associating permissions with content in a mobile information system.

FIG. 3 is a flowchart illustrating an example method 300 for associating permissions with content in a mobile information system. At step 305, a service provider administrator may determine whether a new content provider has registered to provide channel content to the mobile devices of subscribers in the mobile information system. Alternatively, the service provider administrator may determine whether a new channel is being established from an existing content provider or from some other source. Because the channel content may include executable scripts or other sequences of instructions, and because that content may be delivered to one or more mobile devices for execution, the service provider may provide security features to ensure that content delivered to the mobile device is unable to access protected data and/or unable to perform protected activities on the mobile device. Such security features may include associating a set of permissions with the channel feed, communicating these permissions to the mobile device along with the content in the channel feed, and reviewing these permissions at the mobile device to determine whether an information channel is allowed access to restricted activities and data. As described above, the permissions may include standard permissions, standard extension permissions, and custom extension permissions. The permissions may be enforced, for example, by the client 102, runtime component 116, application 108, and/or platform 128 (see FIG. 1), the operations of which may be controlled, at least in part, by the wireless service provider.

If the service provider administrator determines at step 305 that a new channel feed is being established, the service provider administrator may set the standard permissions at step 310, the standard extension permissions at step 315, and any defined custom extension permissions at step 320 for the new channel feed. The service provider administrator sets the standard permissions at step 310 by determining, for each permission in the set of standard permissions, whether the content in the new channel feed is allowed to perform the activity governed by the permission. For example, if the new channel feed will supply content that is strictly under the control of the service provider, local data access may be allowed. But if the new channel feed will supply content from a third party, local data access may be denied. Similarly, the service provider administrator sets the standard extension permissions at step 315 by determining, for each permission in the set of standard extension permissions, whether the content in the new channel feed is allowed to perform the activity governed by the permission. If custom extension permissions have been defined for the mobile information system, the service provider administrator sets the custom extension permissions at step 320 by determining, for each permission in the set of custom extension permissions, whether the content in the new channel feed is allowed to perform the activity governed by the permission.

Some or all of the individual permissions may be preconfigured with a default value. For standard permissions and standard extension permissions, these default values may be hard-coded in the administrator process or in another application associated with the server system. Default values associated with standard permissions and standard extension permissions may also be modified by the service provider administrator. For custom extension permissions, the service provider administrator may assign default values when defining the custom extension permissions. When permissions are preconfigured with a default value, the service provider administrator may accept the default values for some permissions while affirmatively setting the value of other permissions in steps 310, 315, and 320.

At step 325, the service provider administrator may determine whether a new custom extension permission is needed. If the new channel feed is configured to provide content that will execute in a custom extension, the developer of the custom extension may require one or more new permissions for interpretation by the custom extension. The service provider administrator defines the new custom extension permissions at step 330 and sets the new custom extension permissions at step 335. In defining a new custom extension permission, the administrator may select a previously undefined permission reserved in the custom extension permissions data structure and assign it to the custom extension.

If the service provider administrator determines at step 305 that a new channel feed is not being established, the service provider administrator may determine at step 345 whether an update to the permissions of an existing channel feed is needed. An update may be needed, for example, if new content will be provided in an existing channel feed requiring access to restricted data or activities or if new content will be provided in an existing channel feed for execution in a custom extension. If a permissions update is needed, the service provider administrator may determine at step 350 whether the needed update is for existing permissions. Existing permissions include standard permissions and standard extension permissions, as well as custom extension permissions previously assigned to a particular custom extension. If an update to existing permissions is needed, the service provider administrator may perform the necessary updates at step 355 and then may return to step 325 to determine whether a new custom extension permission is needed to complete the permissions update. A new custom extension permission may be needed, for example, if new content will be provided in an existing channel feed for execution in a custom extension. The path for a new channel feed and the path for an update to an existing channel feed converge at step 340, where the new or updated permissions are persistently stored on the server system, where they may be retrieved for future delivery in a content feed.

Figure 4:
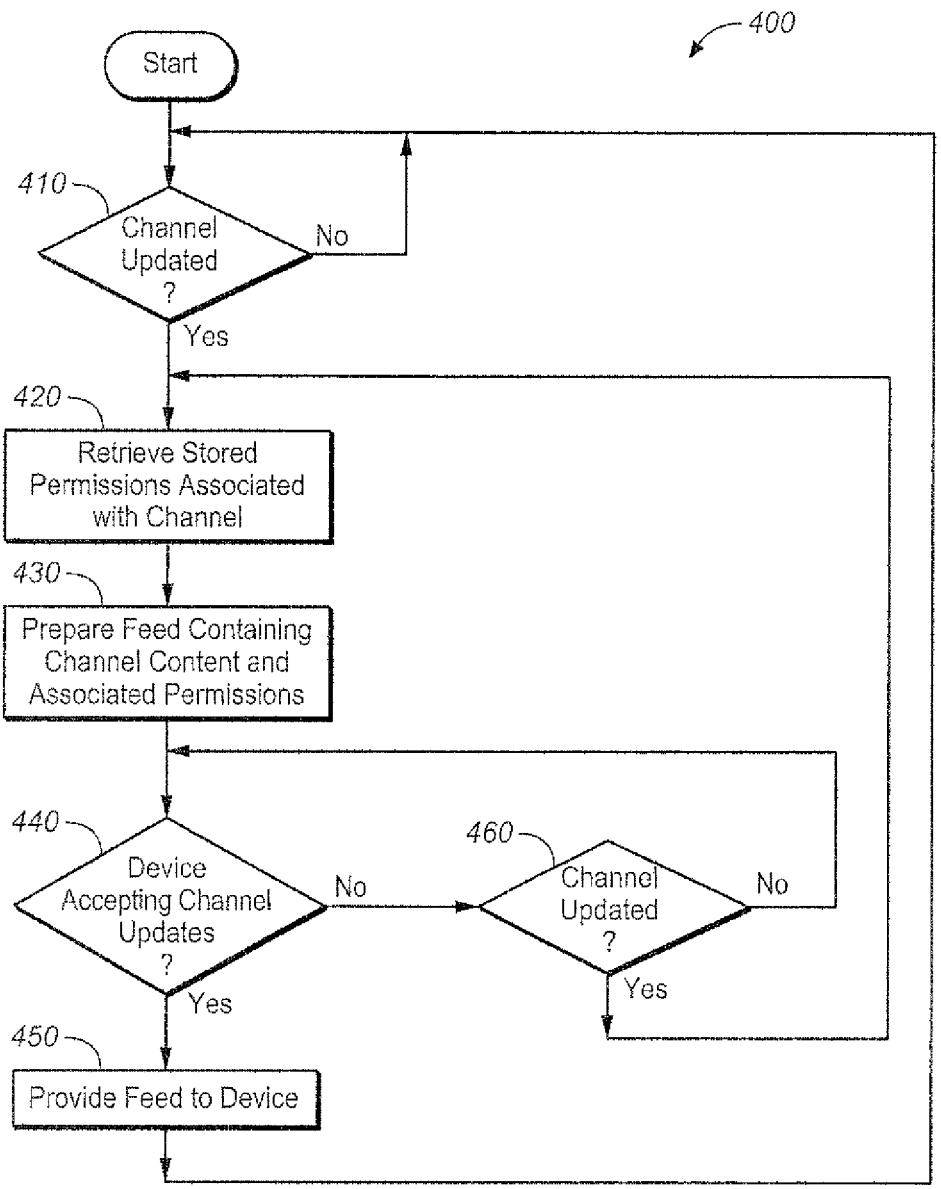
FIG. 4 is a flowchart illustrating an example method for providing content and associated permissions in a mobile information system.

FIG. 4 is a flowchart illustrating an example method 400 for providing content and associated remotely defined permissions to a mobile device in a mobile information system. As previously described, a server system associated with the mobile information system may communicate information in the form of information channel feeds to client components on mobile devices. Content delivered to the mobile devices in the channel feeds may originate with the mobile information system service provider or with third party content providers. At step 410, processes on the server system may determine whether the content or permissions associated with a channel have been updated. If so, processes on the server system may retrieve the channel's permissions from persistent storage at step 420, and prepare a channel feed containing the permissions and the updated channel content at step 430. In some implementations, only a content update will trigger steps 420 and 430 and a permissions update will be delivered in the channel feed along with the next content update. In some implementations, permissions are delivered with the first delivery of channel content to a mobile device and are only delivered in subsequent channel feeds when the permissions have been modified.

After the channel feed is prepared, the server system may determine at step 440 whether a channel subscriber's mobile device is accepting channel updates. A mobile device may not be accepting channel updates, for example, because it is powered off, because it is hibernating to conserve battery life, because it is configured to accept updates at another time, because it is busy performing other tasks, or for other reasons. If the device is accepting channel updates, then the server system may deliver the channel content and/or permissions to the device at step 450 and return to step 410 to wait for additional updates. If the device is not accepting channel updates, then the server system may determine at step 460 whether the channel has been updated again. If not, then the server system may return at step 440 to enter a loop waiting to either deliver the channel feed to the device or to determine that the channel has been updated again. If the channel content is updated again before the previous update is delivered to the mobile device, a new feed may be prepared containing the additional updates. Method 400 may be performed for each channel supported by the mobile information system.

Figure 5:
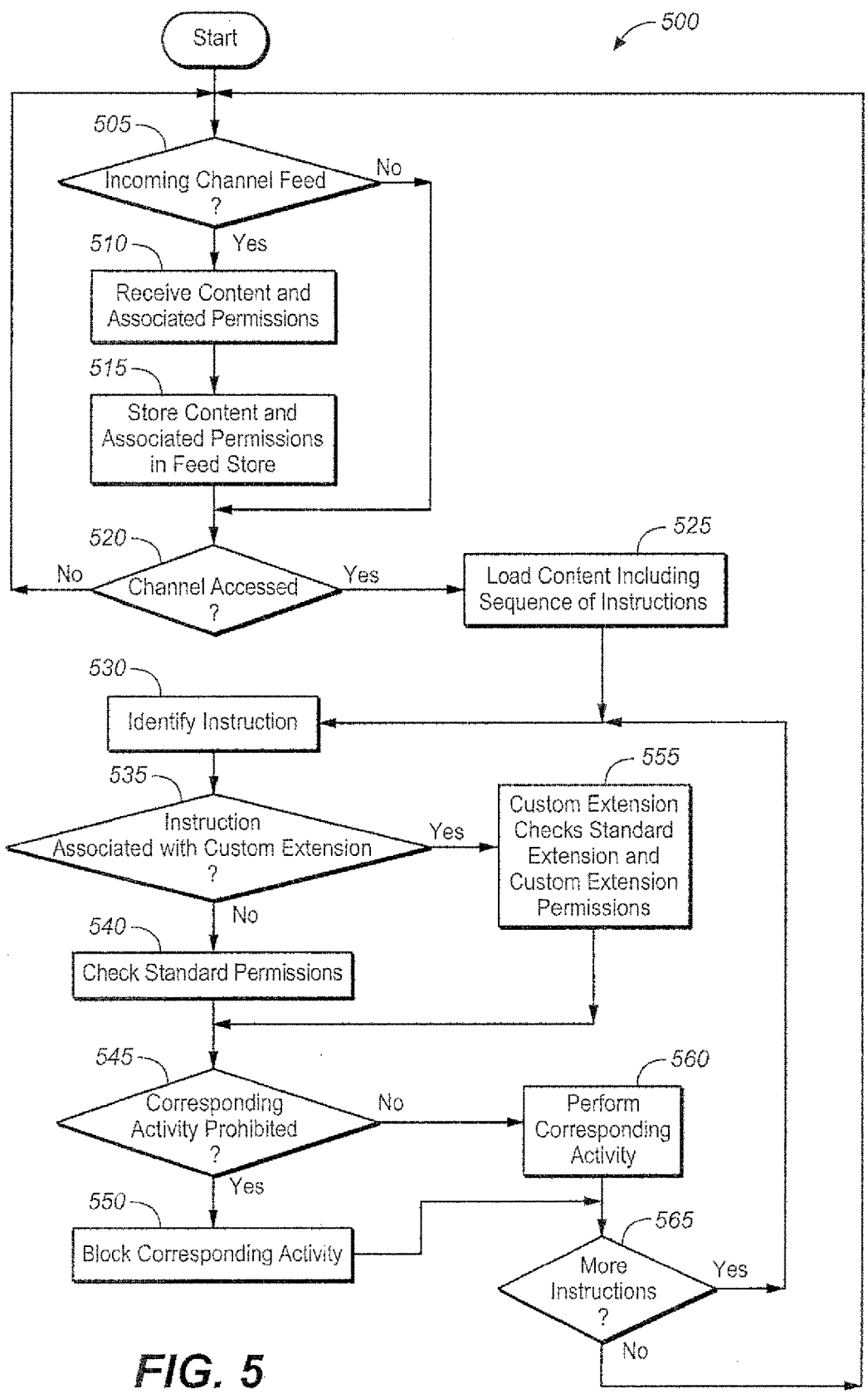
FIG. 5 is a flowchart illustrating an example method for preventing unauthorized activities in a mobile information system.

FIG. 5 is a flowchart illustrating an example method 500 for blocking unauthorized activities in a mobile information system. As previously described, a server system associated with the mobile information system may communicate information in the form of information channel feeds to client components on mobile devices. At step 505, the client component may determine whether the server system has a channel feed ready to deliver to the mobile device. If so, the client receives the channel feed, which may include channel content and the permissions associated with the channel content, at step 510. At step 515, the client may store the received content and associated permissions in a feed store on the mobile device. The mobile device feed store may provide separate storage for the content and associated permissions for each channel subscribed to by the mobile device.

After the incoming channel feed is stored, or if the server has no channel feed ready to deliver, the client may determine at step 520 whether a subscriber is attempting to access a channel on the mobile device. For example, the subscriber may have navigated to a particular channel through the device's user interface and pressed a button, touched a screen, or otherwise indicated that the channel should be displayed or otherwise invoked. If a subscriber is not attempting to access a channel on the mobile device, the client may return at step 505 to wait for either an incoming channel feed or a channel access.

If a subscriber is attempting to access a channel on the mobile device, then the client may access the feed store at step 525, retrieve the channel content and associated permissions, and provide the channel content to a runtime component, such as a media player, on the mobile device. The channel content may comprise a sequence of executable instructions or commands. The runtime component may then identify an instruction or command at step 530 and determine at step 535 whether the instruction or command is implemented in an extension expanding the functionality of the runtime component. If so, the runtime component may provide the instruction or command to the custom extension (e.g., via the client), and the client may provide the extension permissions, which may include standard extension permissions and custom extension permissions, to the custom extension and the custom extension, at step 555, may review the extension permissions. If the instruction or command is not implemented in a custom extension, the runtime component may provide the instruction or command to the client and the client, at step 540, may review the standard permissions. If the permissions review indicates that an activity associated with the instruction or command is prohibited at step 545, then that activity is blocked at step 550. If the permissions inspection indicates that an activity associated with the instruction or command is not prohibited at step 545, then that activity is performed at step 560. The runtime component may then determine at step 565 whether additional commands or instructions are provided in the channel content and if so, may return at step 530 to identify another instruction. If no further commands or instructions are provided in the channel content, the client may return at step 505 to wait for either an incoming channel feed or a channel access.

The preceding flowcharts and accompanying descriptions illustrate example methods. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, methods may be used with additional steps, fewer steps, and/or different steps, so long as the methods remain appropriate.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The described techniques may be implemented in non-mobile environments (e.g., using wire-line communications, such as a cable connection, with a non-mobile client, such as a set-top box).

What is claimed is:

1. A mobile device comprising:
one or more processors; and
a memory having stored thereon computer readable instructions that are executable by the one or more processors to implement a client component and a runtime component, wherein:
the client component is integral with one or more applications of the mobile device and configured to facilitate display and management of content for an application into which the client component is integrated, including:
managing content that is associated with permissions specified to indicate whether protected activities are allowed to be performed in conjunction with rendering the content, and
obtaining the content from storage to provide to the runtime component for rendering;
the runtime component is integral with the one or more applications to render the content for an application into which the runtime component is integrated, the rendering including passing to the client component attempts made by the content to perform the protected activities, the attempts being passed to the client component without the runtime component processing the specified permissions, wherein the client component enforces the specified permissions relative to each of the attempts by:
retrieving the specified permissions from the storage,
allowing the runtime component to perform one or more of the protected activities if permitted by the specified permissions, and
restricting the runtime component from performing said one or more of the protected activities if said one or more of the protected activities are not permitted by the specified permissions.

2. The mobile device of claim 1, wherein the runtime component does not attempt to process the specified permissions associated with the content that the runtime component renders.

3. The mobile device of claim 1, wherein enforcement of the specified permissions by the client component includes:
obtaining data describing a protected activity that the content attempts to perform during the rendering; and
using the data describing the protected activity to determine whether the specified permissions associated with the content permit the protected activity.

4. The mobile device of claim 1, further comprising a custom extension that extends functionality of the runtime component, the custom extension configured to, responsive to an attempt made by the content being rendered to perform activities enabled by the extended functionality, determine whether the specified permissions associated with the content permit the content to perform the activities enabled by the extended functionality.

5. The mobile device of claim 4, wherein the custom extension enforces the specified permissions associated with the content being rendered relative to attempts to perform the activities enabled by the extended functionality by:
allowing the content to perform the activities enabled by the extended functionality if permitted by the specified permissions; and
restricting the content from performing the activities enabled by the extended functionality if the activities enabled by the extended functionality are not permitted by the specified permissions.

6. The mobile device of claim 4, wherein the runtime component does not attempt to process the specified permissions associated with the content being rendered responsive to the attempt made by the content to perform the activities enabled by the extended functionality.

7. The mobile device of claim 4, wherein a command that causes the content being rendered to attempt the activities enabled by the extended functionality is not recognized by an unextended runtime component.

8. The mobile device of claim 4, wherein the client component does not attempt to process the specified permissions associated with the content being rendered responsive to the attempt made by the content to perform the activities enabled by the extended functionality.

9. The mobile device of claim 1, wherein the runtime component comprises a media player that supports rendering at least one of vector graphics, bitmaps, frame-based animation, text input, or dynamic text.

10. The mobile device of claim 1, wherein the client component is further configured to communicate with a remote server system to receive the content and the specified permissions.

11. The mobile device of claim 10, wherein the client component is further configured to store the content and the specified permissions in storage of the mobile device, the content and the specified permissions being accessible from the storage responsive to a user request to access the content.

12. A method implemented by a computing device to control performance of protected activities in conjunction with rendering content, the method comprising:
  responsive to a request by a user to access content, employing a client component of the computing device to retrieve the requested content and permissions specified for the requested content to indicate whether protected activities are allowed to be performed in conjunction with rendering the requested content;
  employing the client component to provide the requested content to a runtime component of the computing device that renders content;
  employing the runtime component to render the requested content;
  responsive to attempts made by the requested content to perform the protected activities in conjunction with being rendered, employing the runtime component to pass the attempts to the client component without processing the specified permissions, wherein the client component enforces the specified permissions relative to each of the attempts by:
    allowing the runtime component to perform one or more of the protected activities if permitted by the specified permissions, and
    restricting the runtime component from performing said one or more of the protected activities if said one or more of the protected activities are not permitted by the specified permissions.

13. The method of claim 12, wherein the runtime component is not employed to enforce the specified permissions associated with the requested content.

14. The method of claim 12, further comprising employing a custom extension that extends functionality of the runtime component to determine whether the specified permissions associated with the requested content allow the requested content to perform activities enabled by the extended functionality.

15. The method of claim 14, wherein the client component is not employed to enforce the specified permissions associated with the requested content responsive to an attempt made by the requested content to perform the activities enabled by the extended functionality.

16. The method of claim 12, wherein the specified permissions include custom extension permissions that are configurable to govern protected activities associated with custom extensions to the runtime component.

17. The method of claim 12, further comprising receiving the specified permissions from a service provider configured to specify the permissions to indicate that the requested content is permitted to perform the protected activities or is restricted from performing the protected activities.

18. A method implemented by a computing device to control performance of protected activities at a remote device in conjunction with rendering content, the method comprising:
  retrieving a permissions data structure for a channel of content, the permissions data structure comprising at least one permission indicator that is indicative of whether at least one protected activity is allowed to be performed by a sequence of instructions that correspond to the channel;
  associating the permissions data structure with a particular sequence of instructions that include an instruction, which when executed causes the at least one protected activity to be performed;
  communicating the sequence of instructions and the permissions data structure to the remote device, which enables the remote device to:
    employ a runtime component to execute the sequence of instructions in association with rendering the content of the channel, and
    employ a client component to enforce permissions indicated by the at least one permission indicator responsive to an attempt made to perform the at least one protected activity in conjunction with execution of the sequence of instructions, the attempt made having been passed to the client component by the runtime component to enforce the indicated permissions without the runtime component having processed the indicated permissions relative to the attempt.

19. The method of claim 18, further comprising interacting with the remote device through a data communication network, interactions with the remote device involving interacting with the remote device as a client.

20. The method of claim 18, further comprising setting the value of the at least one permission indicator prior to communicating the sequence of instructions and the permissions data structure to the remote device.

* * * * *